US009962987B2

(12) United States Patent
Dhôme

(10) Patent No.: US 9,962,987 B2
(45) Date of Patent: May 8, 2018

(54) OPTICAL SECURITY COMPONENT

(71) Applicant: SURYS, Marne la Vallee (FR)

(72) Inventor: Antoine Dhôme, Vaires-sur-Marne (FR)

(73) Assignee: SURYS, Marne la Vallee (FR)

( * ) Notice: Subject to any disclaimer, the term of this patent is extended or adjusted under 35 U.S.C. 154(b) by 0 days. days.

(21) Appl. No.: 15/543,647

(22) PCT Filed: Jan. 15, 2016

(86) PCT No.: PCT/FR2016/050083
§ 371 (c)(1),
(2) Date: Oct. 16, 2017

(87) PCT Pub. No.: WO2016/113517
PCT Pub. Date: Jul. 21, 2016

(65) Prior Publication Data

US 2018/0029402 A1 Feb. 1, 2018

(30) Foreign Application Priority Data

Jan. 16, 2015 (FR) ..................................... 15 50354

(51) Int. Cl.
*B32B 3/02* (2006.01)
*B42D 25/387* (2014.01)
(Continued)

(52) U.S. Cl.
CPC ......... *B42D 25/387* (2014.10); *B42D 25/324* (2014.10); *B42D 25/328* (2014.10); *B42D 25/373* (2014.10); *B42D 25/445* (2014.10)

(58) Field of Classification Search
CPC .... B42D 25/29; B42D 25/00; B42D 2035/20; B42D 25/328; B42D 25/324
(Continued)

(56) References Cited

U.S. PATENT DOCUMENTS 8,262,090 B2 * 9/2012 Soltys ........................ A63F 1/02 273/149 P
8,901,517 B2 * 12/2014 Iftime .................... C09D 11/50 250/461.1
(Continued)

FOREIGN PATENT DOCUMENTS

JP 2007-072188 3/2007
JP 2010-139910 6/2010
(Continued)

*Primary Examiner* — Shin H Kim
(74) *Attorney, Agent, or Firm* — Occhiuti & Rohlicek LLP

(57) ABSTRACT

An ID document comprises a receiving substrate in or on which an ink that is fluorescent under UV-A lighting is locally deposited, and a multilayer optical security component attached to a substrate. The optical component comprises a structurable layer and a reflective dielectric layer discontinuously deposited on the structurable layer in the plane of the component so as to produce patterns. The reflective dielectric layer has a relative transmission of at most 40% in the UV-B or UV-C range. The optical component also include an assembly of at least one layer including pigments that are fluorescent when energized by UV-B or UV-C. These are deposited on the reflective dielectric layer in a uniform or discontinuous manner in the plane of the optical component.

10 Claims, 5 Drawing Sheets

(51) Int. Cl.

| | |
|---|---|
| ***B42D 25/328*** | (2014.01) |
| ***B42D 25/445*** | (2014.01) |
| ***B42D 25/373*** | (2014.01) |
| ***B42D 25/324*** | (2014.01) |

(58) Field of Classification Search

USPC ........................................................... 412/9

See application file for complete search history.

(56) References Cited

U.S. PATENT DOCUMENTS

| | | | | |
|---|---|---|---|---|
| 2002/0031631 | A1* | 3/2002 | Selinfreund ............. | G11B 7/24 428/64.4 |
| 2002/0197510 | A1* | 12/2002 | Drew ................. | G11B 7/00736 428/690 |
| 2012/0068450 | A1 | 3/2012 | Macpherson et al. | |
| 2014/0001377 | A1* | 1/2014 | Iftime .................... | C09D 11/34 250/461.1 |
| 2014/0272468 | A1* | 9/2014 | DeMeio ................. | G02B 1/043 428/704 |
| 2017/0299897 | A1* | 10/2017 | Gallas .................... | G02C 7/104 |

FOREIGN PATENT DOCUMENTS

| | | |
|---|---|---|
| WO | WO 2005/105475 | 11/2005 |
| WO | WO 2008/017362 | 2/2008 |
| WO | WO 2009/005733 | 1/2009 |
| WO | WO 2016/113517 | 7/2016 |

* cited by examiner

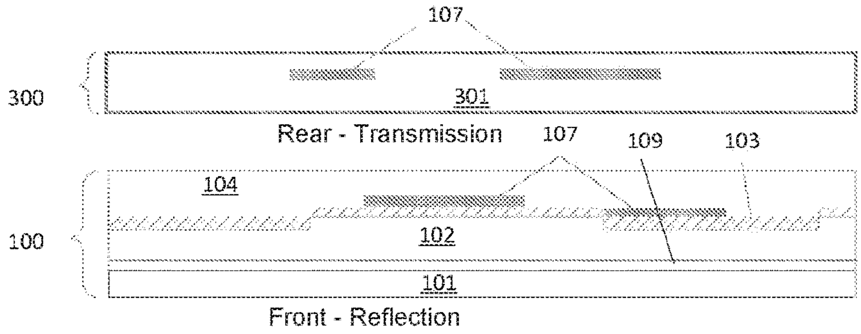
FIGURE 1 – PRIOR ART
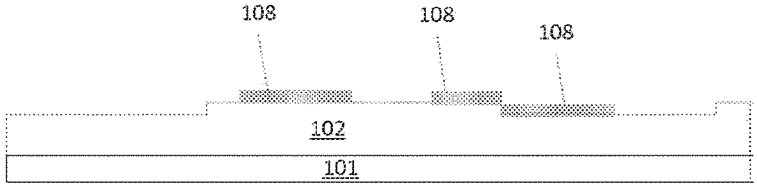
FIGURE 2A
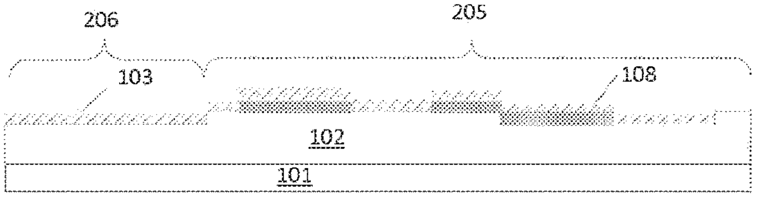
FIGURE 2B
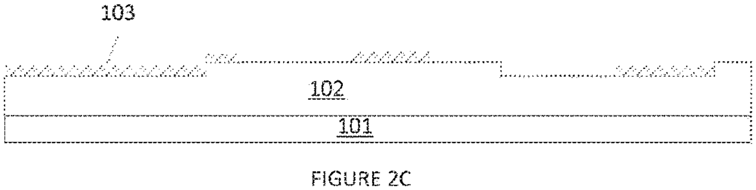
FIGURE 2C
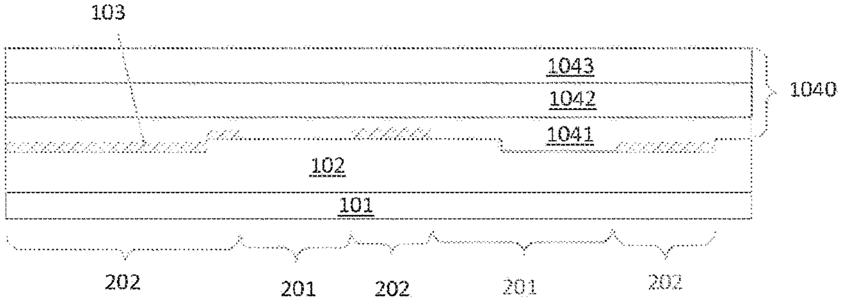
FIGURE 2D

OPTICAL SECURITY COMPONENT

CROSS REFERENCE TO RELATED APPLICATIONS

This application is a National Stage of International Application No. PCT/FR2016/050083 filed on Jan. 15, 2016, which claims priority to French Application No. 1550354 filed on Jan. 16, 2015, the contents of which are hereby incorporated by reference in their entirety.

FIELD OF THE INVENTION

The present invention relates to the field of increasing security via multilayer films.

Such multilayer films, also called optical security components, are said to be security films because they are used to increase the security of identity documents, in particular documents such as passports and identity cards; to increase the security of fiduciary documents, in particular such as banknotes; or even to increase the security of valuable items; "documents" below for the sake of conciseness.

In the case of identity documents or fiduciary documents, a multilayer film is placed on the document or integrated into the document. In the case of valuable items, the multilayer film is integrated into a security label that is placed on said valuable item or on its packaging.

To increase the security of documents, it is known to deposit locally an ink 107 that is fluorescent under illumination in the UV-A on an optical component carrier or a carrier that is optionally integrated into or onto a paper carrier, this being advantageous in that such a deposition allows patterns that become visible and that are readable by machine or a human being under suitable illumination to be drawn.

The present invention aims to provide an alternative and to increase the security of documents by virtue of a multilayer film comprising pigments that are fluorescent under UV-B and/or UV-C excitation, independently of the presence or absence of ink 107 that is fluorescent under illumination in the UV-A.

Furthermore, the present invention provides a new effect for inspecting a transparent security component via a perfect registration between zones of high-optical index, observable under illumination in the visible (spectral band 400-800 nm), and zones including pigments that are fluorescent in the visible under UV-B and/or UV-C excitation.

SUMMARY OF THE INVENTION

More precisely, the invention relates, according to a first of its subject matters, to an identity document comprising:

an assembly of at least one destination carrier (301) in which or on which an ink (107) that is fluorescent under illumination in the UV-A is deposited locally, and a multilayer optical security component placed on a destination carrier (301).

This identity document is essentially characterized in that the optical component furthermore comprises:

a structurable layer (102) that is deposited on the carrier film (101); and a dielectric reflective layer (103) that is deposited on the structurable layer (102) discontinuously in the plane of the component, so as to produce dielectric zones allowing patterns (202) to be drawn; the dielectric reflective layer (103) having a relative transmittance in the UV-B or UV-C domain at most equal to 40%; and an assembly (1040) of at least one layer (1042) including pigments that are fluorescent under UV-B or UV-C excitation, said assembly being deposited on said dielectric reflective layer (103) uniformly or discontinuously in the plane of the optical component.

Provision may furthermore be made for a partially demetallized metallic layer (105) deposited on the structurable layer (102) or on the dielectric reflective layer (103).

Provision may furthermore be made for: a protective layer (106) that is selectively deposited on the metallic layer (105).

Provision may be made for the protective layer (106) to be halftone, so as to comprise islands the shape and size and the spacing between two adjacent islands of which are preset.

Provision may be made for the dielectric reflective layer (103) to locally make contact with the structurable layer (102) or contact with the protective layer (106), so that said optical component locally comprises one stack among:

a successive stack of the carrier film (101), of the structurable layer (102) and of assembly (1040) of at least one layer (1042) including pigments that are fluorescent under UV-B or UV-C excitation;

a successive stack of the carrier film (101), of the structurable layer (102), of the dielectric reflective layer (103), and of assembly (1040) of at least one layer (1042) including pigments that are fluorescent under UV-B or UV-C excitation;

a successive stack of the carrier film (101), of the structurable layer (102), of the dielectric reflective layer (103), of the metallic layer (105), of the protective layer (106), and of assembly (1040) of at least one layer (1042) including pigments that are fluorescent under UV-B or UV-C excitation; and a successive stack of the carrier film (101), of the structurable layer (102), of the metallic layer (105), of the protective layer (106), of the dielectric reflective layer (103), and of assembly (1040) of at least one layer (1042) including pigments that are fluorescent under UV-B or UV-C excitation.

Provision may be made for the structurable layer (102) to comprise an assembly of structures allowing an optically variable image to be generated.

Provision may be made for a detachment layer (109) deposited between the structurable layer (102) and the carrier film (101), and allowing, by thermal activation, the structurable layer (102) to be subsequently separated from the carrier film (101).

Provision may be made for the assembly (1040) of at least one layer (1042) including pigments that are fluorescent under UV-B or UV-C excitation to be composed:

of a layer (1042) of ink that is fluorescent under UV-B or UV-C excitation, said layer being coated with a layer of glue (1043); or of a first adhesive layer (1041), a layer (1042) including pigments that are fluorescent under UV-B or UV-C excitation, which layer is deposited on the first adhesive layer (1041), then a second adhesive layer (1043) deposited on the layer (1042); or of one and the same layer (1042) including pigments that are fluorescent under UV-B or UV-C excitation, also having adhesive properties.

Provision may be made for the dielectric layer (103) to be halftone, so as to comprise islands the shape and size and the spacing between two adjacent islands of which are preset.

Provision may be made for the multilayer optical security component furthermore to comprise at least one among:

an assembly of at least one zone (107) including pigments that are fluorescent under UV-A excitation; and a carrier layer (101), not detachable from the structurable layer (102).

According to another of its subject matters, the invention also relates to a process for manufacturing an optical security component, the process comprising steps consisting in:

depositing a structurable layer (102) on a carrier film (101) made of plastic or of paper, the carrier film (101) and the structurable layer (102) being adjacent to or separated from each other by an assembly of at least one technical layer, depositing on the structurable layer (102) an assembly (1040) of at least one layer (1042) including pigments that are fluorescent when they are exposed to a light source emitting in the UV spectrum, and uniformly depositing a dielectric reflective layer (103).

This process is essentially characterized in that it furthermore comprises steps consisting in, sequentially:

locally depositing on the structurable layer a layer (108) of varnish or ink that is soluble in a liquid, in the form of zones making contact with the structurable layer (102) drawing patterns (201) when they are observed at least in reflection, depositing said dielectric reflective layer (103) on the layer (108) of varnish or ink that is soluble in a liquid, and at least partially in contact therewith, disaggregating the soluble ink (108) by submerging the optical component in said liquid, in order to locally remove the dielectric reflective layer (103) in the location of each zone of soluble varnish (108) in order to reproduce said patterns (201) in said disaggregated dielectric reflective layer (103); and depositing said assembly (1040) of at least one layer (1042) including pigments that are fluorescent when they are exposed to a light source emitting in the UV spectrum on the dielectric reflective layer (103) and in contact therewith.

Provision may furthermore be made for a step consisting in:

subjecting the optical component to a mechanical stress during its submergence, in particular using ultrasound.

Provision may furthermore be made for a step consisting in:

depositing an assembly of at least one technical layer between the carrier film (101) and the structurable layer (102), in particular a detachment layer (104) allowing, by thermal activation, the carrier film (101) to able to be subsequently separated from the structurable layer (102).

Preferably, the step consisting in depositing said assembly (1040) of at least one layer (1042) including pigments that are fluorescent when they are exposed to a light source emitting in the UV spectrum on the dielectric reflective layer (103) and in contact therewith comprises depositing at least one layer (1042) including pigments that are fluorescent when they are exposed to a light source emitting in the UV-B or UV-C spectrum.

Provision may be made for a step consisting in depositing said layer (1042) uniformly or selectively on the optical component.

Preferably, the step consisting in depositing said assembly (1040) of at least one layer (1042) including pigments that are fluorescent when they are exposed to a light source emitting in the UV spectrum on the dielectric reflective layer (103) and in contact therewith comprises at least one of the steps consisting in:

coating said layer (1042) with a layer of glue;

depositing said layer (1042) on a first adhesive layer (1041) and in contact therewith, then coating said layer (1042) with a second adhesive layer (1043); and integrating into said layer (1042), prior to its deposition, adhesive components.

Provision may furthermore be made for steps consisting in:

uniformly depositing a metallic layer (105) on the optical component, subsequently to the step consisting in depositing said dielectric reflective layer (103);

depositing a protective layer (106) directly in contact with the metallic layer (105), selectively in the form of zones drawing patterns when they are observed at least in reflection;

demetallizing the metallic layer (105) by dissolving zones of the metallic layer (105) that are not protected by the protective layer (106), drawing patterns when they observed at least in reflection.

Provision may furthermore be made for steps consisting in, prior to the step consisting in depositing said dielectric reflective layer (103):

uniformly depositing a metallic layer (105) on the optical component;

depositing a protective layer (106) directly in contact with the metallic layer (105), selectively in the form of zones drawing patterns when they are observed at least in reflection;

demetallizing the metallic layer (105) by dissolving zones of the metallic layer (105) that are not protected by the protective layer (106), drawing patterns when they observed at least in reflection.

Preferably the optical component furthermore comprises a hologram. In this case, the zones of the layer (108) of varnish or ink that is soluble in a liquid making contact with the structurable layer (102) are deposited in register with said hologram, so that the patterns (201) reproduce the outline of said hologram.

Provision may be made for zones (202) corresponding to those zones of the optical component for which the dielectric layer (103) has been preserved; the method furthermore comprising a step consisting in generating a halftone effect in the zones (202), by deposition of the protective layer (106) on the metallic layer (105) or deposition of the dielectric layer (103) selectively so as to create islands the shape and size and the spacing between two adjacent islands of which are preset.

Other features and advantages of the present invention will become more clearly apparent on reading the following description, which is given merely by way of nonlimiting illustrative example and with reference to the appended figures.

DESCRIPTION OF THE DRAWINGS

FIG. 1 illustrates a cross section of a multilayer film according to the prior art;

FIGS. 2A to 2D sequentially illustrate in cross section a first embodiment of an optical component according to invention, FIGS. 3A to 3G sequentially illustrate in cross section a second embodiment of an optical component according to invention, FIGS. 4A to 4F sequentially illustrate in cross section a third embodiment of an optical component according to invention.

DETAILED DESCRIPTION

Figure 3A:
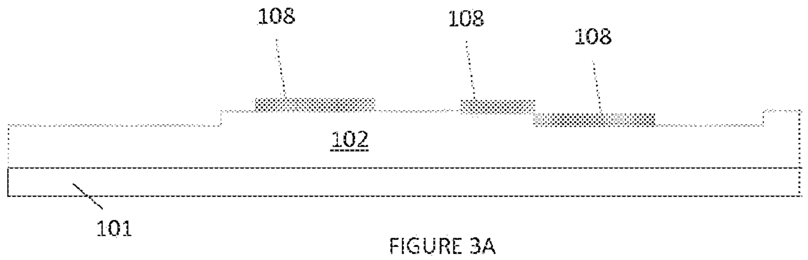
Figure 3B:
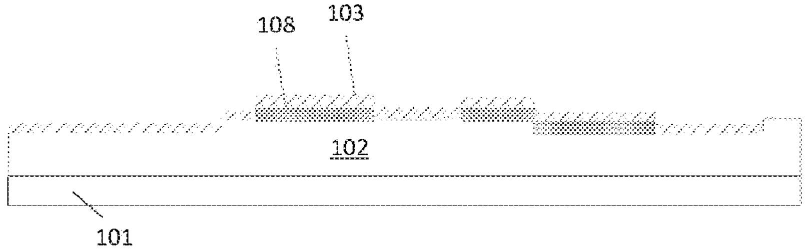
Figure 3C:
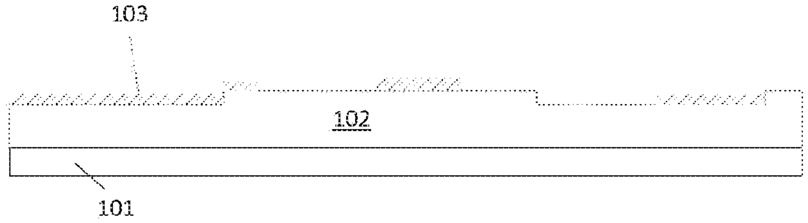
Figure 3D:
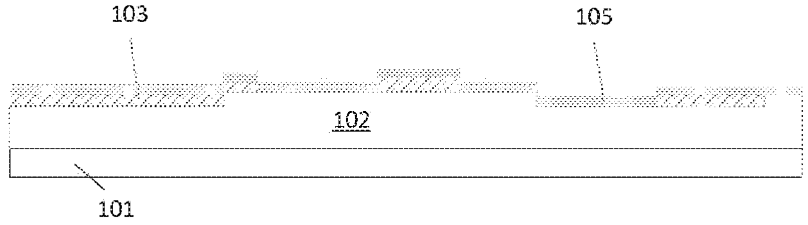

For the sake of simplicity, here "optical component" and "multilayer film"; "ink" and "varnish"; "film" and "layer" have been equated.

Likewise, an optical component is here described as being planar. Depending on its constituent materials, it may nevertheless have a certain degree of flexibility, in particular when the optical component takes the form of a self-adhesive label.

By UV-A what is meant is the spectrum 315-400 nm, by UV-B what is meant is the spectrum 280-315 nm and by UV-C what is meant is the spectrum 100-280 nm.

A multilayer security film is intended to be observed at least in reflection. It comprises a front face and a back face (FIG. 1). By convention, the expression "front face" is defined as the face via which the optical component can be illuminated in reflection and the expression "back face" is defined as the face that is intended to make contact with a for example paper, polycarbonate, PVC or plastic carrier, called a "destination" carrier, and for example via an adhesive. The destination carrier may possibly moreover be transparent or have a lower opacity than that of the optical component.

Moreover, the relative position of certain layers may have an influence on the optical effects of said component. During the manufacture of the film, at least certain layers are therefore deposited in a preset order in order to provide the optical security component with its optical properties, as described below.

In the context of the present invention, by convention, a cross section of the optical component is considered to be oriented so that the bottom of the optical component corresponds to the front face, i.e. the structurable layer 102 or the carrier film 101, and so that the top of the optical component corresponds to the back face, i.e. the layer 104 or the assembly 1040, which are described below. Thus, if a given layer A is deposited on another given layer B, what is meant by "deposited on" is the fact that the layer A is located above the layer B in cross section, without however necessarily making contact therewith. In terms of manufacturing process, this means, unless otherwise specified, that the layer A is deposited subsequently to the layer B.

Prior Art

FIG. 1 illustrates a cross section of a conventional multilayer film intended to be placed on a document 300 comprising a destination carrier 301. Its manufacturing process is as follows.

On a carrier film 101 made of plastic, essentially allowing the optical component to be manufactured and typically polyethylene terephthalate (PET) or equivalent, a structurable layer 102 is deposited. The carrier film 101 essentially serves to manufacture the optical component. The layer 102 is said to be "structurable" in that it is capable of locally including structures, i.e. protrusions and recesses, the dimensions (in particular the height) of which are typically comprised between one nanometer and one micron, and that influence the reflection, diffraction or scattering of an incident electromagnetic wave. The layer 102 is said to be "structured" when it includes such structures. For example, the structurable layer may be structured by hot stamping a thermoformable varnish or by cold molding and UV curing of an ad hoc varnish (casting varnish) to give the layer 102.

Moreover, the carrier film 101 and the structurable layer 102 may be adjacent or separated from each other by an assembly of at least one what is called "technical layer", such as for example what is called a "detachment" layer 109 allowing, during thermal activation, the carrier film 101 to be subsequently separated from the structurable layer 102.

During the manufacture of the optical component, a layer of zinc sulfide (ZnS) 103 of thickness comprised between 10 and 500 nm is deposited by vacuum thermal evaporation or by any other suitable method (electron-beam evaporation, etc.). This layer 103 of ZnS uniformly covers the entirety of the surface of the component, i.e. all the surface of the structurable layer 102.

Certain multilayer films furthermore comprise local zone-wise deposits of an ink 107 that is fluorescent under UV-A excitation. Alternatively, the zones of an ink 107 that is fluorescent under UV-A excitation may be deposited not on the multilayer film but on the destination carrier 301, as illustrated in FIG. 1.

The zones of fluorescent ink typically allow a pattern that is observable in reflection to be drawn.

Next, a technical layer 104 is coated over all the layer of ZnS 103. When the component comprises zones of fluorescent ink 107, said zones are also covered by the technical layer 104. The technical layer 104 may be an adhesive layer comprising an adhesive material; and/or a protective layer, for example comprising a varnish.

Invention

A new and extraordinarily ingenious way of producing similar patterns is proposed here.

To this end, provision is made for the absolute value of the variation in refractive index between the structurable layer 102 and the dielectric reflective layer 103 to be higher than or equal to 0.5. Furthermore, the advantageously high-refractive-index dielectric reflective layer 103 has a relative transmittance in the UV-B and/or UV-C domain at most equal to 40% and is discontinuous in the plane of the component so as to produce dielectric zones allowing patterns to be drawn. Provision is then made to coat this dielectric reflective layer 103 with an assembly 1040 of at least one layer 1042 including pigments that are fluorescent under UV excitation and in particular UV-B or UV-C excitation, as described below.

The term "fluorescent" is used for the sake of conciseness. In the context of the present invention, the term "fluorescent" must be understood to mean "photoluminescent", i.e. to also encompass phosphorescence.

In all the embodiments below, provision is made for a structurable layer 102 to be deposited on a carrier film 101, in the present case one made of plastic.

The structurable layer 102 and the carrier film 101 may make direct contact with each other, as illustrated. Provision may also be made for an assembly of at least one technical layer between the structurable layer 102 and the carrier film 101. For example what is called a "detachment" layer 109 allowing, by thermal activation, the structurable layer 102 to be subsequently separated from the carrier film 101 is deposited between the structurable layer 102 and the carrier film 101, as illustrated in FIG. 1.

First Embodiment

A first embodiment is illustrated in FIGS. 2A to 2D.

As illustrated in FIG. 2A, provision is made to selectively deposit, in the present case by printing, in particular by rotogravure, a partial layer of soluble varnish 108 (for example an ink based on polyvinyl alcohol) on the structurable layer 102 and preferably in direct contact with the latter. The selective deposition in the form of zones of soluble varnish 108 makes it possible to draw patterns 201 when they are observed at least in reflection.

Provision is then made to cover the component, in the present case the structurable layer 102 and the zones of soluble varnish 108, with a dielectric reflective layer 103 (typically of ZnS or $TiO_2$), as illustrated in FIG. 2B.

Once the dielectric reflective layer 103 has been deposited by any known means, provision is made to disaggregate the layer 108, for example by submerging the optical component in a suitable bath, i.e. a bath containing a solution that disaggregates the soluble varnish 108 when it makes contact therewith. The destruction of the layer 108 results in the dielectric reflective layer 103 being removed locally from locations of each zone of soluble varnish 108, as illustrated in FIG. 2C. Such techniques are known, for example from document U.S. Pat. No. 6,896,938. Provision may furthermore be made to subject the optical component to a mechanical stress during its submergence, for example via a step consisting in subjecting the optical component to ultrasound, this facilitating the disaggregation of the soluble ink 108.

Thus, the pattern 201 drawn by the disaggregated zones of the dielectric reflective layer 103 reproduces the pattern 201 drawn by the zones of varnish 108 before their dissolution, this being why these two patterns have here been referenced with the same reference number. As explained below, the pattern 201 is observable by fluorescence when it is illuminated by a light source emitting in the UV spectrum, but less visible when it is illuminated by a light source emitting in the visible spectrum.

Provision is then made to coat the optical component with an assembly 1040 of at least one layer 1042 including pigments that are fluorescent under UV excitation, below "the" layer 1040 for the sake of conciseness, see FIG. 2D. By "pigments that are fluorescent under UV excitation" or even "UV-fluorescent ink", what is meant is that the pigments (or the ink comprising such pigments) are fluorescent when they are exposed to a light source emitting in the UV and in particular the UV-B or UV-C wavelength domain.

The assembly 1040 may consist of at least one of the following variants:

In a first variant, the assembly 1040 is composed of a layer 1042 of ink that is fluorescent under UV excitation, said layer being coated with a layer of glue 1043.

In a second variant, the assembly 1040 is composed of a first adhesive layer 1041, a layer 1042 of ink that is fluorescent under UV excitation, then a second adhesive layer 1043.

In a third variant, the assembly 1040 is composed of one and the same layer 1042 of ink that is fluorescent under UV excitation, also having adhesive properties.

The layer 1042 of UV-fluorescent ink may be applied uniformly to the optical component, in which case the pattern 201 appearing in observation under UV light corresponds to the pattern formed by the disaggregated zones of the dielectric reflective layer 103, the pattern of which advantageously corresponds to the pattern of the dissolved soluble varnish 108 (FIG. 2D).

The layer 1042 of UV-fluorescent ink may be applied selectively to the optical component, thereby creating zones of UV-fluorescent ink allowing patterns to be drawn when they are observed in reflection under UV illumination. In this case, under UV illumination a combination of the pattern drawn by the layer 1042 of UV-fluorescent ink and of the pattern 201 drawn by the disaggregated zones of the dielectric reflective layer 103 is observed, the fluorescence being observable only in the zones printed with UV-fluorescent ink that are not covered by the reflecting zones of dielectric reflective layer 103.

Thus, observation of the optical component in reflection in UV light allows an image to be generated that is observable on three levels: an absence of UV-fluorescent ink, a UV-fluorescent ink filtered by the dielectric, and a UV-fluorescent ink.

The structurable layer 102 may make direct contact with zones of dielectric reflective layer 103, make direct contact with zones 1042 of UV-fluorescent ink, or contact with a first adhesive layer 1041.

The lower face (reflection side) of the assembly 1040 of at least one layer 1042 including pigments that are fluorescent under UV excitation makes direct contact with the structurable layer 102 or direct contact with a zone of dielectric reflective layer 103.

In this embodiment, the optical component may therefore locally comprise one of the following stacks:

a successive stack of the layers 101, 102, 1040; or a successive stack of the layers 101, 102, 103, 1040.

Second Embodiment

A second embodiment is illustrated in FIGS. 3A to 3G.

In the second embodiment, provision is made, as in the first embodiment illustrated in FIG. 2A, to selectively deposit a partial layer of soluble varnish 108 (for example an ink based on polyvinyl alcohol) on the structurable layer 102, and preferably directly in contact therewith, and in the present case by printing, in particular rotogravure. The selected deposition in the form of zones of soluble varnish 108 allows patterns to be drawn when they are observed at least in reflection.

Provision is then made to cover the component, in the present case the structurable layer 102 and the zones of soluble varnish 108, with a dielectric reflective layer 103 (typically ZnS or $TiO_2$), as illustrated in FIG. 2B.

Once the dielectric reflective layer 103 has been deposited by any known means, provision is made to submerge the optical component in order to disaggregate the soluble ink 108 which, via its destruction, locally removes the dielectric reflective layer 103 in line with each zone of soluble varnish 108, as illustrated in FIG. 2C. Such techniques are known, for example from document U.S. Pat. No. 6,896,938. Provision may furthermore be made to subject the optical component to a mechanical stress during its submergence, for example via a step consisting in subjecting the optical component to ultrasound, this facilitating the disaggregation of the soluble ink 108.

Thus, the pattern drawn by the zones of the disaggregated dielectric reflective layer 103 reproduces the pattern drawn by the zones of varnish 108 before their dissolution. The embodiments illustrated in FIGS. 2A, 2B and 2C are therefore identical to the embodiments illustrated in FIGS. 3A, 3B and 3C, respectively.

In the second embodiment, provision is then made to deposit a metallic layer 105 that is applied uniformly to the optical component, which has the advantage of having optical properties that are visually different such as for example opacity, reflectivity and/or enhanced diffraction, and/or of allowing plasmonic effects that require the presence of a metallic layer.

Figure 3E:
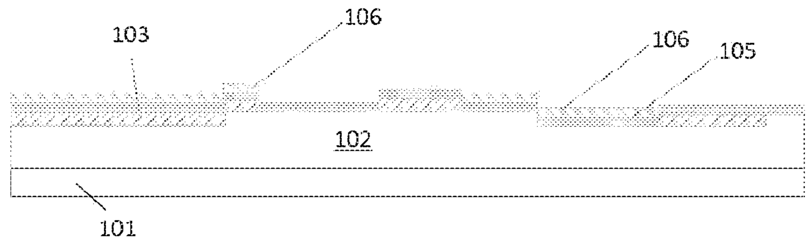

Provision is then made to selectively deposit a protective layer 106, in the present case a varnish, in direct contact with the metallic layer 105, as illustrated in FIG. 3E. The selective zonewise deposition of protective layer 106 allows patterns (not illustrated) to be drawn.

Provision is then made to demetallize the metallic layer 105, in the present case by submerging the optical component in a caustic soda solution.

Figure 3F:
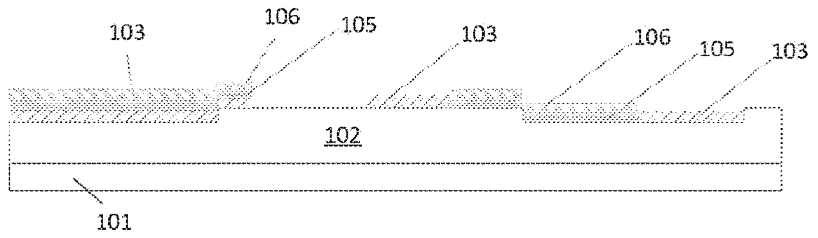

The zones of the metallic layer 105 not protected by the protective layer 106 are then dissolved, as illustrated in FIG. 3F, thereby also allowing a pattern (not illustrated) to be created by the demetallization of the metallic layer 105.

Next, as in the first embodiment, provision is made to coat the optical component with an assembly of at least one layer including pigments that are fluorescent in the visible under UV excitation 1040, below "the" layer 1040 for the sake of conciseness.

The assembly 1040 may consist of at least one of the following variants.

In a first variant, the assembly 1040 is composed of a layer 1042 of UV-fluorescent ink that fluoresces in the visible under UV excitation, said layer being coated with a layer of glue.

In a second variant, the assembly 1040 is composed of a first adhesive layer 1041, a layer 1042 of UV-fluorescent ink that fluoresces in the visible under UV excitation (for example a coated protective layer), then a second adhesive layer 1043.

Figure 3G:
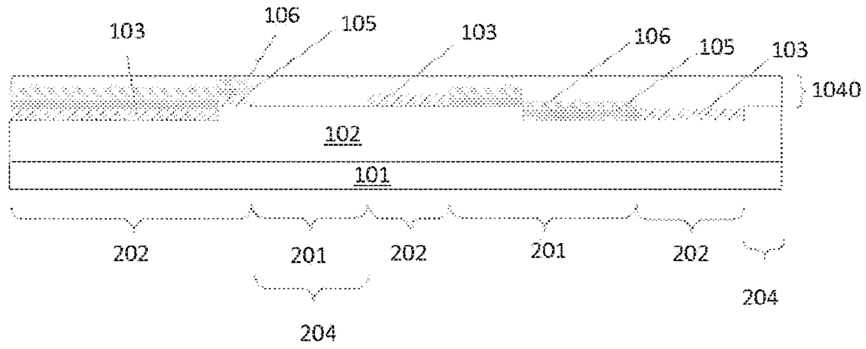

In a third variant, the assembly 1040 is composed of one and the same layer 1042 of UV-fluorescent ink that fluoresces in the visible under UV excitation, also having adhesive properties (see FIG. 3G).

In this embodiment, the assembly 1040 is applied uniformly to the optical component, in which case the pattern 204 appearing in observation under UV-B or UV-C light corresponds to the pattern formed by the zones of the disaggregated dielectric reflective layer 103, the pattern of which advantageously corresponds to the pattern of the dissolved soluble varnish 108, with the exception of the metallized zones (FIG. 3G).

The structurable layer 102 may make direct contact with zones of dielectric reflective layer 103, direct contact with the assembly 1040 comprising zones of UV-fluorescent ink, or contact with those zones of the metallic layer 105 which are protected by the protective layer 106.

Those zones of the metallic layer 105 which are protected by the protective layer 106 make direct contact therewith. They may either make contact with the structurable layer 102, or are stacked on zones of dielectric reflective layer 103.

The upper face of the structurable layer 102 makes contact with zones of dielectric reflective layer 103, with the assembly 1040 of at least one layer including pigments that are fluorescent the assembly 1040 under UV excitation, or makes contact with zones of the metallic layer 105.

The upper face of the zones of the metallic layer 105 makes direct contact with the protective layer 106.

The lower face (reflection side) of the zones of the metallic layer 105 makes contact with the structurable layer 102 or contact with zones of dielectric reflective layer 103.

In this embodiment, the optical component may therefore locally comprise one of the following stacks:

a successive stack of the layers 101, 102, 1040;

a successive stack of the layers 101, 102, 103, 1040; or a successive stack of the layers 101, 102, 103, 105, 106, 1040.

The second embodiment advantageously allows, with respect to the first embodiment, a stack of zones of the metallic layer 105 making direct contact with the protective layer 106 to be added locally, thereby allowing additional patterns, visible in reflection, to be drawn by virtue of the partially demetallized metallic layer 105.

Third Embodiment

A third embodiment is illustrated in FIGS. 4A to 4F.

Figure 4A:
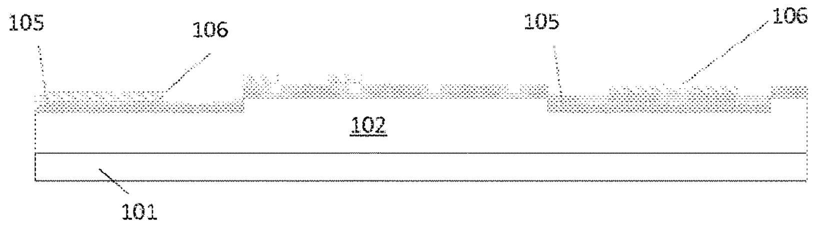

Provision is made to deposit a metallic layer 105, which is applied uniformly to the optical component, in the present case directly in contact with the structurable layer 102, as illustrated in FIG. 4A.

Figure 4B:
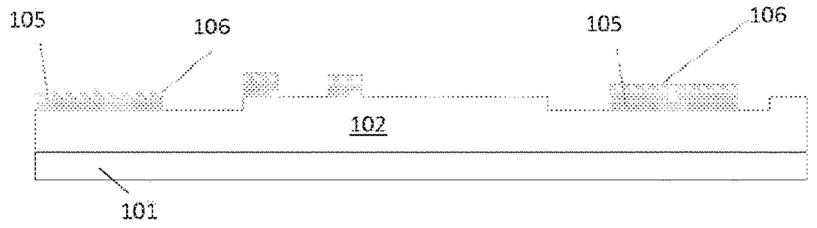

Directly in contact with the metallic layer 105, provision is then made to selectively deposit a protective layer 106, in the present case a varnish, as illustrated in FIG. 4B. The selective zonewise deposition of protective layer 106 allows patterns to be drawn.

Provision is then made to demetallize the metallic layer 105, for example by submerging the optical component in a caustic soda solution. Demetallization, or partial metallization, is for example known from document U.S. Pat. No. 5,145,212.

The zones of the metallic layer 105 not protected by the protective layer 106 are then dissolved, as illustrated in FIG. 4B.

Figure 4C:
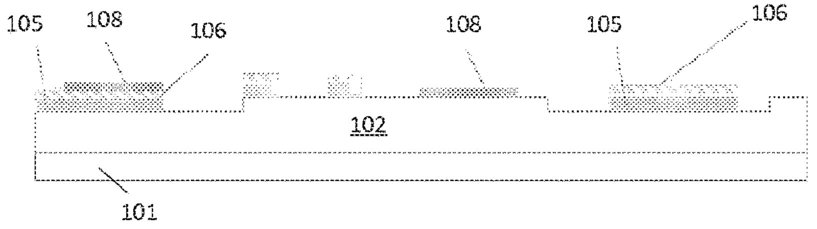

Provision is made to selectively deposit, in the present case by printing, in particular by rotogravure, a partial layer of soluble varnish 108 (for example an ink based on polyvinyl alcohol) in contact with the structurable layer 102 or in contact with at least one zone of protective layer 106, see FIG. 4C. The selective deposition in the form of zones of soluble varnish 108 allows patterns to be drawn when they are observed at least in reflection.

Figure 4D:
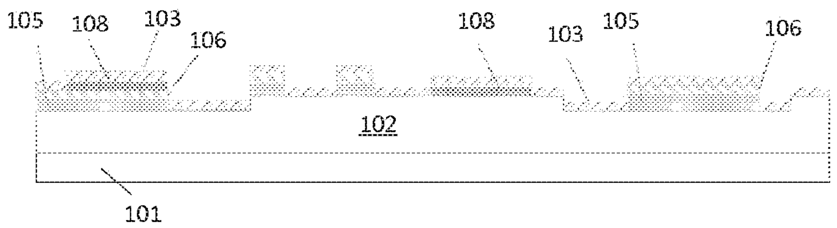

Provision is then made to cover the component, in the present case the structurable layer 102, the zones of soluble varnish 108, and those zones of the metallic layer 105 which are protected by the zones of the protective layer 106, with a dielectric reflective layer 103 (typically ZnS or titanium dioxide ($TiO_2$), as illustrated in FIG. 4D.

Figure 4E:
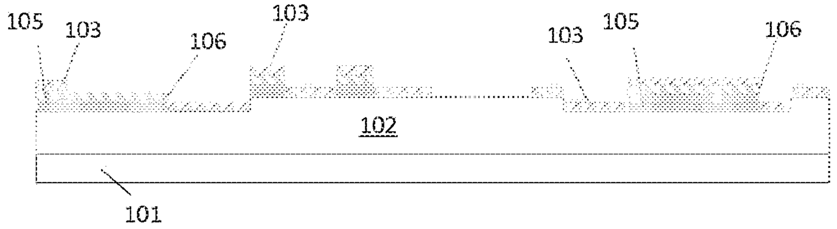

Once the dielectric reflective layer 103 has been deposited by any known means, provision is made to submerge the optical component in order to disaggregate the soluble ink 108 that, via its destruction, locally removes the dielectric reflective layer 103 in the locations of each zone of soluble varnish 108, as illustrated in FIG. 4E.

Thus, the pattern drawn by the zones of the disaggregated dielectric reflective layer 103 reproduces the pattern drawn by the zones of varnish 108 before their dissolution (ignoring the metallized zones).

Provision may furthermore be made to subject the optical component to a mechanical stress during its submergence, for example via a step consisting in subjecting the optical component to ultrasound, thereby facilitating the disaggregation of the soluble ink 108.

Next, as in the first embodiment, provision is made to coat the optical component with an assembly of at least one layer including pigments that are fluorescent in the visible under UV excitation, below "the" layer 1040 for the sake of conciseness.

The assembly 1040 may consist of at least one of the following variants.

In a first variant, the assembly 1040 is composed of a layer 1042 of UV-fluorescent ink that fluoresces in the visible under UV excitation, said layer being coated with a layer of glue 1043.

In a second variant, the assembly 1040 is composed of a first adhesive layer 1041, a layer 1042 of UV-fluorescent ink that fluoresces in the visible under UV excitation (for example a coated protective layer), then a second adhesive layer 1043.

Figure 4F:
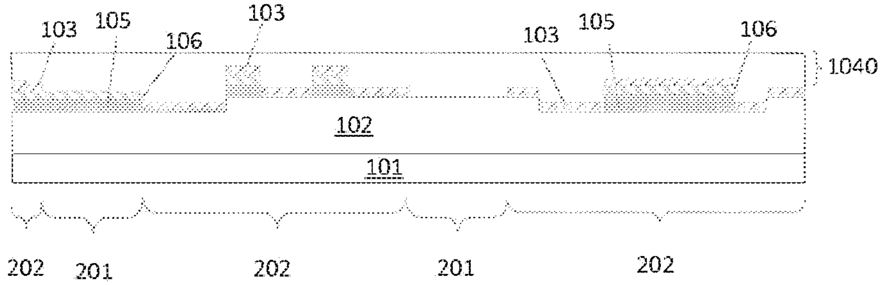

In a third variant, the assembly 1040 is composed of one and the same layer 1042 of UV-fluorescent ink that fluoresces in the visible under UV excitation, also having adhesive properties (see FIG. 4F).

In this embodiment, the assembly 1040 is applied uniformly to the optical component, in which case the pattern appearing in observation under UV light corresponds to the pattern formed by the zones of the disaggregated dielectric reflective layer 103, the pattern of which advantageously corresponds to the pattern of the dissolved soluble varnish 108 (FIG. 4F), ignoring the metallized zones.

The structurable layer 102 may make direct contact with zones of dielectric reflective layer 103, direct contact with the assembly 1040 comprising zones of UV-fluorescent ink, or contact with those zones of the metallic layer 105 which are protected by the protective layer 106.

The upper face of the zones of the metallic layer 105 makes direct contact with the protective layer 106.

The lower face (reflection side) of the zones of the metallic layer 105 makes contact with the structurable layer 102.

The upper face of the zones of the dielectric reflective layer 103 makes direct contact with the assembly 1040 comprising zones of UV-fluorescent ink.

The lower face (reflection side) of the zones of the dielectric reflective layer 103 makes direct contact with the structurable layer 102, or direct contact with the protective layer 106.

The upper face (transmission side) of the protective layer 106 may make contact with at least one of the zones of the dielectric reflective layer 103 or direct contact with the assembly 1040 comprising zones of UV-fluorescent ink.

In this embodiment, the optical component may therefore locally comprise one of the following stacks:

a successive stack of the layers 101, 102, 1040;

a successive stack of the layers 101, 102, 103, 1040; or a successive stack of the layers 101, 102, 105, 106, 103, 1040.

The third embodiment advantageously allows, with respect to the second embodiment, the position of the zones of the dielectric reflective layer 103 to be locally inverted with respect to the stack of zones of the metallic layer 105 making direct contact with the protective layer 106, thereby making it possible not to subject the dielectric deposition to the step of demetallization of the metal, which may cause deterioration of the layer.

Application to a Security Document

Whatever its embodiment, an optical component according to the invention is advantageously integrated into any security document, for example an identity document a passport, etc. or a fiduciary document, for example a banknote. It may take the form of a label for adhesively bonding to a product or a valuable item.

Figure 5A:
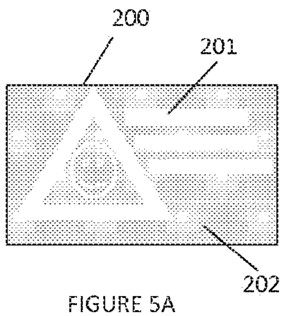
FIG. 5A illustrates a view in reflection of an optical component according to the invention illuminated by a source of visible light.
Figure 5B:
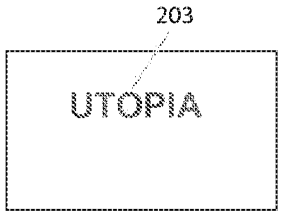
FIG. 5B illustrates a view in reflection of the optical component of FIG. 5A illuminated by a source of UV-A light.
Figure 5C:
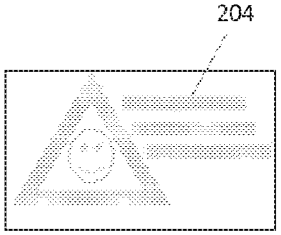
FIG. 5C illustrates a view in reflection of the optical component of FIG. 5A illuminated by a source of UV-C light.

Security documents 200 possess a destination carrier in paper or plastic form that incorporates patterns 203 that are visible only under illumination by a light source emitting in the UV-A (FIG. 5B).

Figure 6:
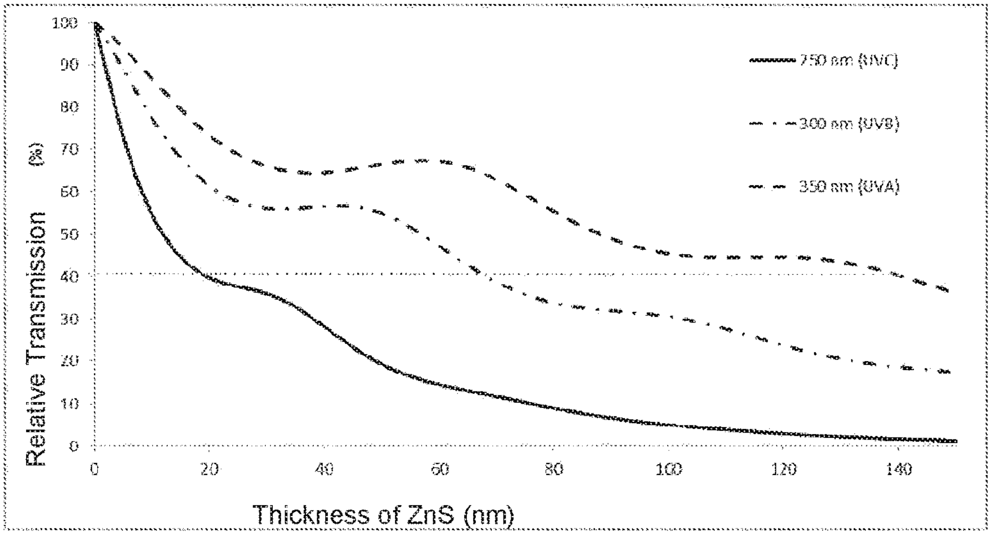
FIG. 6 illustrates the variation in the transmittance of a layer of ZnS as a function of its thickness.

Preferably, the dielectric used for the reflective layer 103 is ZnS, and the ink used for the layer 1042 is a UV-fluorescent ink that fluoresces in the visible under UV-C or UV-B excitation because ZnS filters by absorption the UV-B and UV-C, as illustrated in FIG. 6 which is an experimental curve produced by the applicant.

FIG. 6 illustrates the variation in the relative transmittance of the fluorescence emitted by a layer 1042 the thickness and the concentration in pigments of which have been normalized, through a layer of ZnS, as a function of the thickness of the layer of ZnS, and for three values of wavelength: a wavelength $\lambda$=250 nm (UV-C), a wavelength $\lambda$=300 nm (UV-B) and a wavelength $\lambda$=350 nm (UV-A). Such pigments are for example known from documents WO2014048702 and WO2009005733.

The decrease in transmittance as a function of thickness clearly illustrates the filter effect exerted by the layer of ZnS. The fluorescence emitted by the pigments under UV-C is lower than the fluorescence emitted by the pigments under UV-B, which itself is lower than the fluorescence emitted by the pigments under UV-A.

Empirically, it is estimated that below a relative transmittance equal to 40%, the fluorescence is no longer observable. Thus, for thicknesses of layer 103 comprised between 20 nm and 140 nm, said layer 103 is indeed a spectral filter blocking the fluorescence of the pigments of the layer 1042 under UV-B or UV-C whereas the fluorescence of the pigments if any of the ink 107 remain observable. Assuming that a destination carrier comprises an ink 107 containing pigments that are fluorescent under UV-A illumination and that the optical component according to the invention is locally superposed with at least one partial layer 107, the presence of dielectric 103 according to the invention is no obstacle to the reading of the pattern drawn by the zones of ink 107 under UV-A illumination. The optical component according to the invention is therefore compatible with the presence of such inks in a destination carrier or in said optical component.

Under UV-C or UV-B illumination, the ZnS screens the fluorescence of the ink of the layer 1042, and therefore only the patterns 201 of any one of the preceding embodiments give rise to a fluorescence visible in the form of fluorescent patterns 204.

The zones or patterns 201 correspond to those zones of the optical component for which the dielectric 103 has been locally removed and the zones or patterns 202 correspond to those zones of the optical component for which the dielectric 103 has been preserved.

Thus, as the manufacturer of the proposed optical component has no control over the position of the patterns 203 visible under UV-A illumination, the creation of a pattern visible in UV-C and/or UV-B advantageously makes it possible not to hinder the reading of said patterns 203 under UV-A illumination, and reciprocally, that the patterns 203 visible under UV-A illumination do not disrupt the reading of the patterns 201 visible under UV-C and/or UV-B illumination.

Hologram

Provision may be made for the multilayer film to furthermore comprise an area containing an optically variable image, also called a hologram or holographic image 205, i.e. an assembly of microstructured zones of the structurable layer 102 that are designed to produce an optically variable visual effect also known as a DOVID (Diffractive Optical Variable Image Device), this in itself increasing the security of the optical component.

The DOVID, commonly called a "hologram" (not illustrated), observable in visible light, is generated by stamping the structurable layer 102 and is visible on the finished product only in the zones including a reflective layer (metallic layer 105 or high-refractive-index layer 103) i.e. in one of the zones 202. In the zones of the optical component where the layer 102 makes direct contact with the assembly 1040, the grating is said to be "blocked" and the holographic image is no longer observable.

The surface of the hologram and the pattern 201 visible in UV may be complementary (unless metal is present) with each other.

Provision may advantageously be made for the zones of soluble varnish 108 to be deposited in register with the hologram. To this end, provision may be made for the soluble varnish 108 to be slightly colored in order to facilitate the positioning.

Thus, by virtue of the invention, it is possible to create a pattern visible in UV-C and/or UV-B that is identical in its contours and in its position to the hologram, by depositing soluble ink 108 in register with the hologram.

Without this solution, the falsification of a security document comprising a hologram and an identical pattern visible in UV would typically consist in superposing a layer comprising the pattern in UV-fluorescent ink on the holographic layer of the optical component. However, such a superposition is never perfect if only because of the mechanical tolerances at play.

In contrast, the invention allows the hologram to be perfectly outlined in UV-C and/or UV-B because the hologram and pattern 201 visible in UV are both generated in the same manufacturing process, this increasing the security level of the optical component.

Preferably, provision is made in this case for the lateral extension D2 of the hologram 205 to be smaller than the lateral extension D1 of the structured zone of the structurable layer 102 liable to bear said hologram.

Figure 7A:
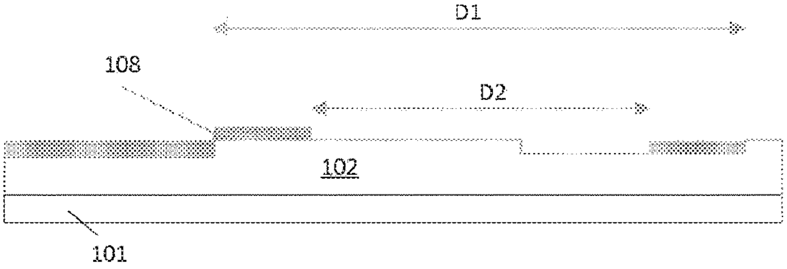
FIGS. 7A and 7B illustrate two stages of production of one embodiment of an optical component according to the invention, comprising a hologram.
Figure 7B:
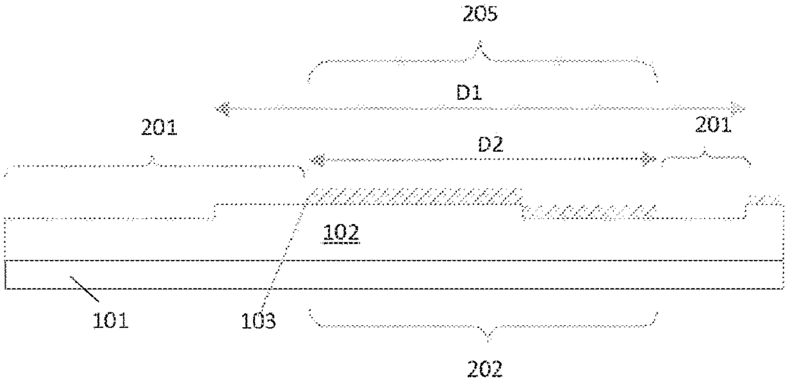

To this end, the ink 108 may be partially deposited on the structured zone of the layer 102 (FIG. 7A), this giving, after deposition of the dielectric layer 103 and disaggregation of the ink 108, a hologram 205 the outline of which is fluorescent (FIG. 7B) when it is illuminated by a UV-B or UV-C source, via the zones 201.

To check the authenticity of the document, provision may be made for steps consisting in illuminating the document with visible light and recording the position of the hologram in a memory, illuminating the document with UV-C and/or UV-B and recording the position of the pattern 201 in a memory, and then comparing the two images, and in particular their position.

Halftones

In the second and third embodiment, provision may furthermore be made for the protective layer 106 to be selectively deposited on the metallic layer 105 so as to create islands the shape and size and the spacing between two adjacent islands of which are preset, thereby typically allowing a halftone effect to be generated in the zones 202 comprising dielectric.

Provision may also be made for the dielectric layer 103 to be halftone, i.e. selectively deposited so as to create islands the shape and size and the spacing between two adjacent islands of which are preset, thereby making it possible to create all sorts of small areas that are meaningless in visible light but that form a pattern that has meaning under UV-B or UV-C illumination.

Transparency

According to the invention, the carrier layer 101, when it is not detachable from the optical component, the structurable layer 102, the dielectric reflective layer 103 and the assembly 1040 of at least one layer including pigments that are fluorescent under UV excitation are preferably at least partially transparent in the visible, so that data carried by the document 300 may be recognized optically when the optical component is placed on the document and the latter is illuminated in the visible domain.

Nomenclature

100 Optical component

101 Carrier layer

102 Structurable layer

103 (ZnS, TiO2, etc.) dielectric reflective layer

104 Technical layer

105 Metallic layer

106 Protective layer protecting the metallic layer

107 Partial layer of ink that is fluorescent under UV-A excitation

108 Layer of varnish or of ink that is soluble in a liquid

200 Security document

201 Pattern drawn by the zones of the disaggregated dielectric reflective layer, or pattern drawn by the zones of varnish 108 before their dissolution, in visible light, seen in reflection

202 Pattern corresponding to those zones of the optical component for which the dielectric 103 has been preserved, seen in reflection

203 Pattern visible only under illumination with a light source emitting in the UV-A

204 Pattern 201 that is fluorescent, illuminated with UV-C light

205 DOVID: structured zone of the structurable layer making contact with the dielectric reflective layer

300 Document

301 Destination carrier

1040 Assembly of at least one layer including pigments that are fluorescent under UV-B or UV-C excitation

1041 First adhesive layer

1042 Layer including pigments that are fluorescent under UV-B or UV-C excitation

1043 Second adhesive layer

The invention claimed is:

1. A manufacture comprising an identity document said identity document comprising an assembly of at least one destination carrier in which or on which an ink that is fluorescent under illumination in the UV-A is deposited locally, and a multilayer optical security component placed on the destination carrier, the component comprising a structurable layer, and an assembly of at least one layer including pigments that are fluorescent under UV-B or UV-C excitation, a dielectric reflective layer that is deposited on the structurable layer discontinuously in the plane of the component, so as to produce dielectric zones allowing patterns to be drawn, the dielectric reflective layer having a relative transmittance in the UV-B or UV-C domain at most equal to 40%, wherein the assembly of at least one layer includes pigments that are fluorescent under UV-B or UV-C excitation that have been deposited on said dielectric reflective layer, uniformly or discontinuously, in the plane of the optical component.

2. The manufacture of claim 1, further comprising a partially demetallized metallic layer deposited on a layer selected from the group consisting of the structurable layer and the dielectric reflective layer.

3. The manufacture of claim 2, further comprising protective layer that is selectively deposited on the metallic layer.

4. The manufacture of claim 3, wherein the protective layer is halftone, wherein the protective layer comprises islands, wherein the shape and size of the islands is preset, and wherein spacing between two adjacent islands is preset.

5. The manufacture of claim 3, wherein the dielectric reflective layer locally makes contact with the structurable layer or contact with the protective layer, so that said optical component locally comprises one stack among a successive stack of a carrier film of the structurable layer and of assembly of at least one layer including pigments that are fluorescent under UV-B or UV-C excitation, a successive stack of a carrier film of the structurable layer of the dielectric reflective layer, and of assembly of at least one layer including pigments that are fluorescent under UV-B or UV-C excitation a successive stack of a carrier film, of the structurable layer, of the dielectric reflective layer, of the metallic layer, of the protective layer, and of assembly of at least one layer including pigments that are fluorescent under UV-B or UV-C excitation and a successive stack of a carrier film, of the structurable layer, of the metallic layer, of the protective layer, of the dielectric reflective layer, and of assembly of at least one layer including pigments that are fluorescent under UV-B or UV-C excitation.

6. The manufacture of claim 1, wherein the structurable layer comprises an assembly of structures allowing an optically variable image to be generated.

7. The manufacture of claim 5, further comprising a detachment layer deposited between the structurable layer and the carrier film, and allowing, by thermal activation, the structurable layer to be subsequently separated from the carrier film.

8. The manufacture of claim 1, wherein the assembly of at least one layer including pigments that are fluorescent under UV-B or UV-C excitation is composed of a layer selected from the group consisting of a layer of ink that is fluorescent under UV-B or UV-C excitation, said layer being coated with a layer of glue, a first adhesive layer, a layer including pigments that are fluorescent under UV-B or UV-C excitation, which layer is deposited on the first adhesive layer, then a second adhesive layer deposited on the layer and one and the same layer including pigments that are fluorescent under UV-B or UV-C excitation, also having adhesive properties.

9. The manufacture of claim 1, wherein the dielectric layer is halftone, so as to comprise islands the shape and size and the spacing between two adjacent islands of which are preset.

10. The manufacture of claim 5, wherein said multilayer optical security component further comprises a structure selected from the group consisting of an assembly of at least one zone including pigments that are fluorescent under UV-A excitation, and said carrier film, not detachable from the structurable layer.

* * * * *